United States Patent
Voecks et al.

(10) Patent No.: US 11,347,427 B2
(45) Date of Patent: May 31, 2022

(54) SEPARATION OF DATASET CREATION FROM MOVEMENT IN FILE REPLICATION

(71) Applicant: EMC IP Holding Company LLC, Hopkinton, MA (US)

(72) Inventors: Austin Voecks, Bainbridge, WA (US); Michael Frank, Seattle, WA (US); Evgeny Popovich, Port Coquitlam (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/916,810

(22) Filed: Jun. 30, 2020

(65) Prior Publication Data

US 2021/0405881 A1     Dec. 30, 2021

(51) Int. Cl.
*G06F 3/06*     (2006.01)

(52) U.S. Cl.
CPC ............ *G06F 3/065* (2013.01); *G06F 3/0619* (2013.01); *G06F 3/0673* (2013.01)

(58) Field of Classification Search
CPC ....... G06F 3/065; G06F 3/0619; G06F 3/0673
See application file for complete search history.

(56) References Cited

U.S. PATENT DOCUMENTS

| 7,054,892 | B1* | 5/2006 | Phillips | G06F 11/1458 |
| 8,286,030 | B1* | 10/2012 | Chatterjee | G06F 11/1662 |
| | | | | 714/20 |
| 2007/0277012 | A1* | 11/2007 | Hara | G06F 12/00 |
| | | | | 711/162 |
| 2014/0081911 | A1* | 3/2014 | Deshpande | G06F 3/067 |
| | | | | 707/610 |
| 2016/0110262 | A1* | 4/2016 | Nanivadekar | G06F 11/1456 |
| | | | | 707/654 |
| 2018/0225177 | A1* | 8/2018 | Bhagi | G06F 16/21 |
| 2019/0339870 | A1* | 11/2019 | Meiri | G06F 9/45558 |
| 2019/0347351 | A1* | 11/2019 | Koomthanam | H04L 41/084 |

\* cited by examiner

*Primary Examiner* — Hiep T Nguyen

(74) *Attorney, Agent, or Firm* — Amin, Turocy & Watson, LLP

(57) ABSTRACT

Systems and methods facilitating separation of dataset creation from movement in file replication are described herein. A method as described herein can include scheduling, by a first system operatively coupled to a processor, a first transfer of a dataset to a second system at a first time according to a first replication schedule; scheduling, by the first system, a second transfer of the dataset to a third system at the first time according to a second replication schedule; creating, by the first system, a snapshot of the dataset at a second time that is distinct from the first time according to a snapshot schedule that is distinct from the first replication schedule and the second replication schedule; and transferring, by the first system, at least a portion of the snapshot to the second system and the third system at the first time.

20 Claims, 11 Drawing Sheets

SEPARATION OF DATASET CREATION FROM MOVEMENT IN FILE REPLICATION

TECHNICAL FIELD

The subject application is related to data storage, and more particularly, to data replication techniques for file storage systems.

BACKGROUND

In data storage systems, such as file storage systems and/or object storage systems, a data mover can be employed in software and/or hardware to transfer data between distinct devices and/or systems. For instance, a data mover can allow replication of a file system dataset to a cloud storage system and/or other suitable devices or systems.

A data mover can define respective policies, which are descriptions of a dataset, as well as a schedule for moving respective datasets. A dataset can be defined by a file system snapshot in order to provide a point-in-time consistency. Additionally, a data transfer can be defined as the act of moving a namespace and corresponding content between systems, e.g., from a source system to a target system. To these and/or related ends, it is desirable to implement techniques that improve the efficiency and accuracy of dataset replication between systems.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a replication scheduling component that schedules a first transfer of a dataset to a first target storage system at a first time according to a first replication schedule and schedules a second transfer of the dataset to a second target storage system at the first time according to a second replication schedule. The executable components can further include a snapshotting component that generates a snapshot of the dataset at a second time that precedes the first time according to a snapshot schedule that is distinct from the first replication schedule and the second replication schedule. The executable components can additionally include a replication component that transfers at least a portion of the snapshot to the first target storage system and the second target storage system at the first time.

In another aspect, a method is described herein. The method can include scheduling, by a first system operatively coupled to a processor, a first transfer of a dataset to a second system at a first time according to a first replication schedule and additionally scheduling by the first system, a second transfer of the dataset to a third system at the first time according to a second replication schedule. The method can also include creating, by the first system, a snapshot of the dataset at a second time that is distinct from the first time according to a snapshot schedule that is distinct from the first replication schedule and the second replication schedule. The method can further include transferring, by the first system, at least a portion of the snapshot to the second system and the third system at the first time.

In an additional aspect, a non-transitory machine-readable medium including computer executable instructions is described herein. The instructions, when executed by a processor of a data storage system, can facilitate performance of operations including scheduling a first transfer of a dataset to a first remote system at a first time according to a first replication schedule, scheduling a second transfer of the dataset to a second remote system at the first time according to a second replication schedule, generating a snapshot of the dataset at a second time according to a snapshot schedule that is distinct from the first replication schedule and the second replication schedule, and replicating at least a portion of the snapshot to the first remote system and the second remote system at the first time.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

As noted above, a data mover can be utilized to transfer datasets between different storage systems. As used herein, the term "dataset" refers to a collection of data (as stored in files, objects, or the like) that is designated for transferal between different locations, e.g., different locations within a same system and/or within different systems. By way of example, a data mover can be used to transfer a dataset from a file storage system to another file storage system, an object storage system (e.g., a cloud storage system), and/or any other suitable location(s).

Various aspects described herein can improve the efficiency and accuracy of dataset transfers as described above by separating dataset generation and replication into independent functionality. For instance, when the dataset definition of two or more data transfers match, various aspects as described herein can create a single dataset that can be shared between multiple transfers to the same and/or different target storage systems. As further described below, various aspects provided herein can be utilized for both initial (baseline) replications of a given dataset, e.g., replication of a dataset to multiple target systems, as well as for subsequent incremental replications.

By implementing independent dataset generation and replication functionality as described herein, various advantages that can improve the functionality of a computing system can be realized. These advantages can include, but are not limited to, the following. The number of dataset snapshots associated with transferring an underlying dataset can be reduced, resulting in a reduction of computing resources (e.g., processor cycles, memory usage, power consumption, etc.) associated with generating said snapshots as well as a similar reduction in disk storage associated with storing said snapshots. Consistency can be ensured and/or guaranteed between data associated with a common dataset as transferred to multiple edge systems. Computing resource usage associated with change computation for an incremental dataset replication can be reduced. Other advantages are also possible.

Figure 1:
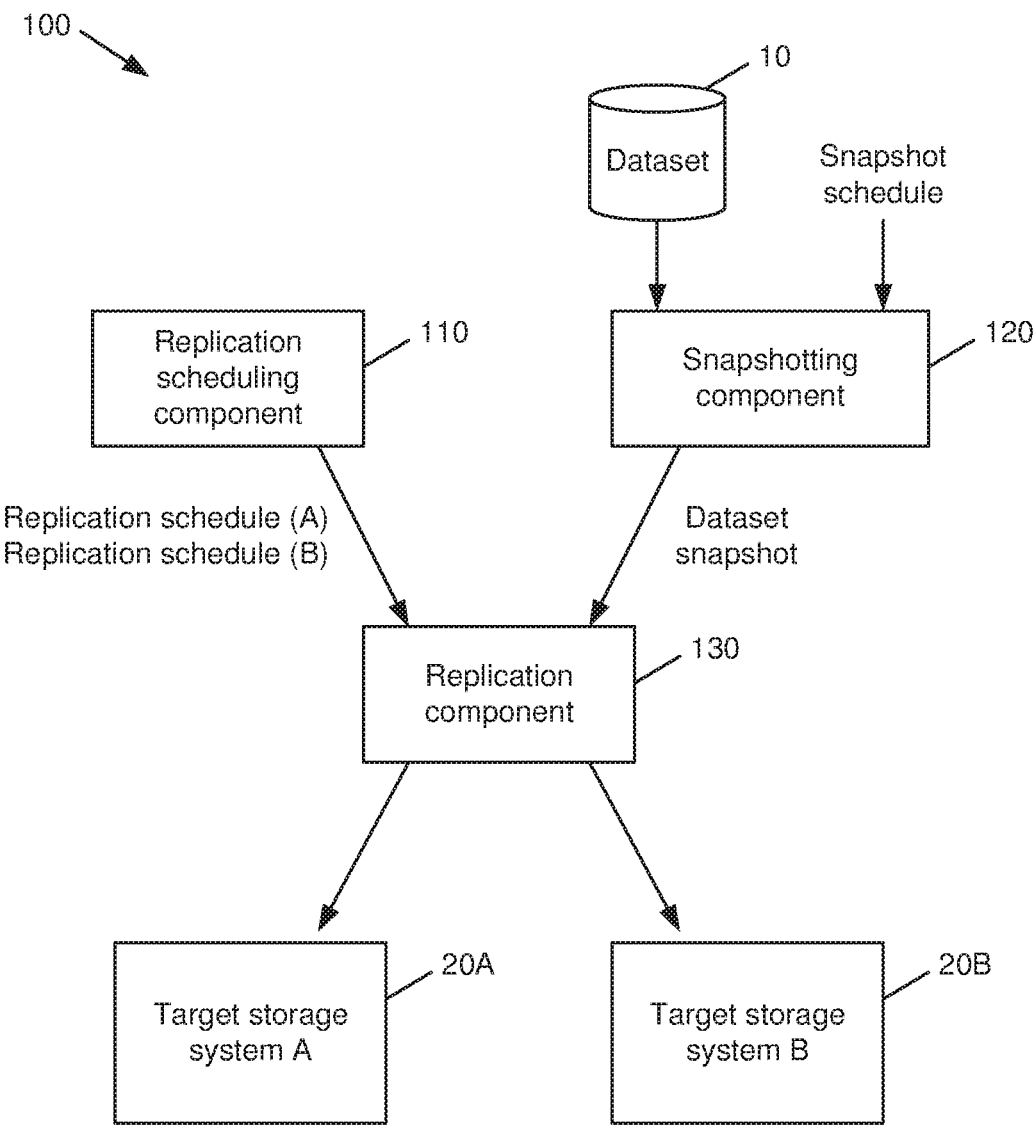
FIG. 1 is a block diagram of a system that facilitates separation of dataset creation from movement in file replication in accordance with various aspects described herein.

With reference now to the drawings, FIG. 1 illustrates a block diagram of a system 100 that facilitates separation of dataset creation from movement in file replication in accordance with various aspects described herein. As shown in FIG. 1, system 100 includes a replication scheduling component 110, a snapshotting component 120, and a replication component 130, which can operate as described in further detail below. In an aspect, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 11.

In an aspect, the components 110, 120, 130 can be associated with a computing node and/or other computing device associated with a file storage system and/or other data storage system. Also or alternatively, the components 110, 120, 130 can be associated with a dedicated data mover device that facilitates movement of datasets between different data storage systems associated with the data mover device. In another aspect, the components 110, 120, 130, and/or other components as will be described in further detail below, can be implemented on a same computing device and/or distributed among multiple computing devices.

Returning to FIG. 1, the replication scheduling component 110 of system 100 can schedule a first transfer of a dataset 10 to a first target storage system 20, denoted in FIG. 1 as target storage system 20A, at a first time defined by a first replication schedule for target storage system 20A. Additionally, the replication scheduling component 110 can schedule a second transfer of the dataset 10 to a second target storage system 20, denoted in FIG. 1 as target storage system 20B, at the first time according to a second replication schedule for target storage system 20B. While only two target storage systems 20A-20B are shown in FIG. 1, it should be appreciated that various aspects herein could be extended to enable replication to any suitable number of target storage systems 20 without departing from the scope of this description or the claimed subject matter. Additionally, in some implementations, the target storage system 20 can be a remote storage system and/or otherwise implemented to be distinct from the system 100. Also or alternatively, the target storage system 20 can be the same system as system 100 and/or a subsystem of system 100. Other implementations are also possible.

As further shown in FIG. 1, the snapshotting component 120 of system 100 can generate a snapshot of the dataset 10 at a second time, e.g., a second time that precedes the time scheduled by the replication scheduling component 110 for transferring the dataset 10 as described above. As used herein, the term "snapshot" refers to an immutable, point-in-time copy of a dataset. Additionally, a snapshot can be a one-to-one copy of the underlying dataset, or alternatively one or more optimizations or modifications can be made to the snapshot for purposes of efficiency. In an aspect, system 100 can be configured to replicate snapshots generated by the snapshotting component 120, e.g., instead of a live file system and/or other underlying data items that would otherwise correspond to a snapshot, to ensure consistency between respective transfers of the snapshot, e.g., as will be described in more detail below.

In an aspect, the second time at which the snapshotting component 120 creates a snapshot for the dataset 10 can be defined by a snapshot schedule that is distinct and independent from the replication schedules associated with the target storage systems 20A-20B. Subsequently, the replication component 130 as shown in system 100 can transfer at least a portion of the snapshot as generated by the snapshotting component 120 to target storage systems 20A and 20B at the first time as defined by their respective replication schedules.

In an aspect, by separating dataset creation from replication in the manner described above, dataset replication to multiple target systems can be performed with fewer overall snapshots as compared to techniques in which a new snapshot is created for each policy regardless of schedule or dataset description similarities. Additionally, the use of separate dataset creation and replication schedules as described herein can result in data associated with a common dataset that is transferred in multiple replication instances being identical or otherwise consistent in each of those instances. This can be beneficial, for example, in a content distribution network (CDN) and/or other similar systems in which consistency between the contents of respective edge systems is desirable. In cases in which a dataset definition is not shared between CDN-like policies (e.g., due to a separate dataset snapshot being transferred for each replication instance), it cannot be assured that the resulting data on the respective edge systems will be the same, e.g., due to potential changes to the dataset occurring between respective generations of that dataset.

Figure 2:
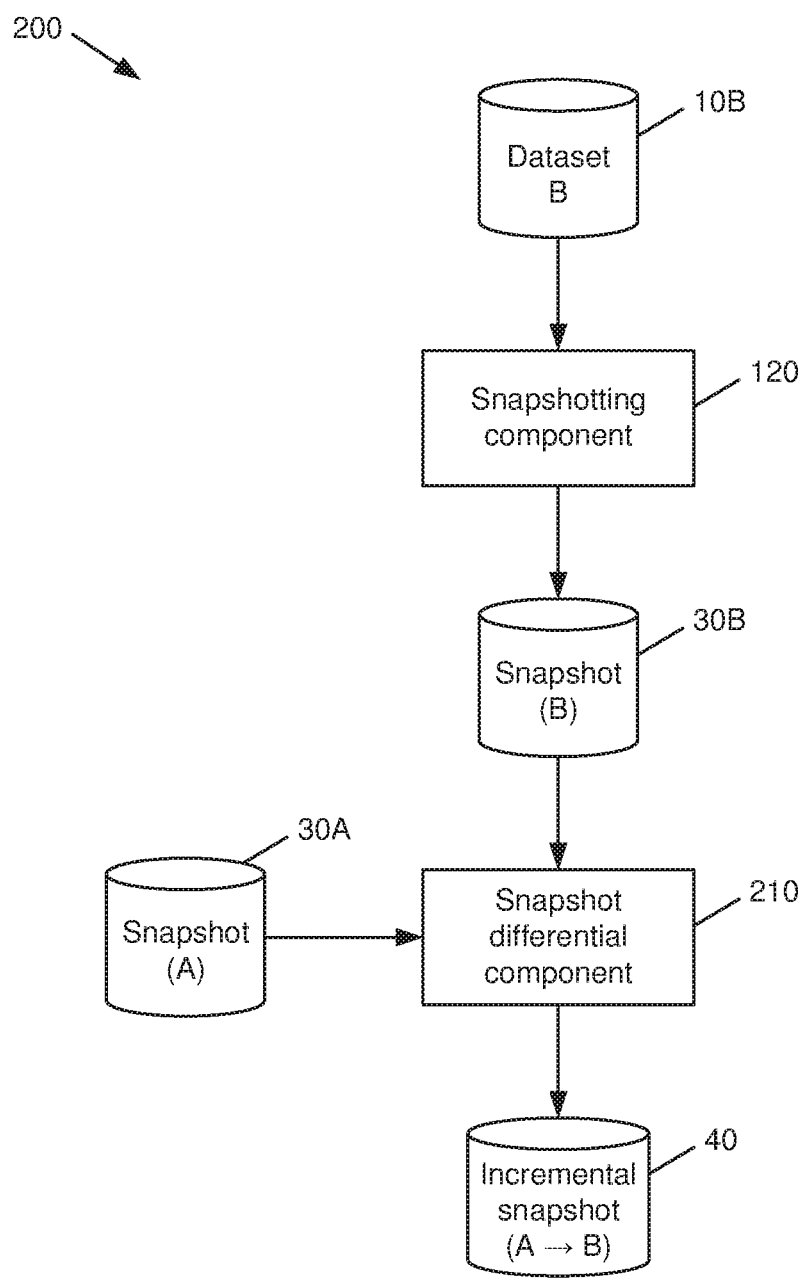
FIG. 2 is a block diagram of a system that facilitates incremental dataset snapshot generation in accordance with various aspects described herein.

With reference next to FIG. 2, a block diagram of a system 200 that facilitates incremental dataset snapshot generation in accordance with various aspects described herein is illustrated. Repetitive description of like elements employed in other embodiments described herein is omitted for brevity. As shown in FIG. 2, a snapshotting component 120 can process a given dataset 10B to create a snapshot 30B for the dataset 10B, e.g., according to one or more snapshotting techniques known in the art. As further shown by FIG. 2, system 200 can additionally include a snapshot differential component 210 that can construct an incremental snapshot 40, which can include and/or otherwise correspond to respective changes between the snapshot 30B generated for the dataset 10B by the snapshotting component 120 and another snapshot 30A corresponding to an earlier state of the dataset 10B, e.g., as generated by the snapshotting component 120 prior to generating the snapshot 30B. In an aspect, the incremental snapshot 40 can itself be a snapshot, or alternatively the incremental snapshot 40 can provide a summary of differences between two existing snapshots with reference to those snapshots.

Figure 3:
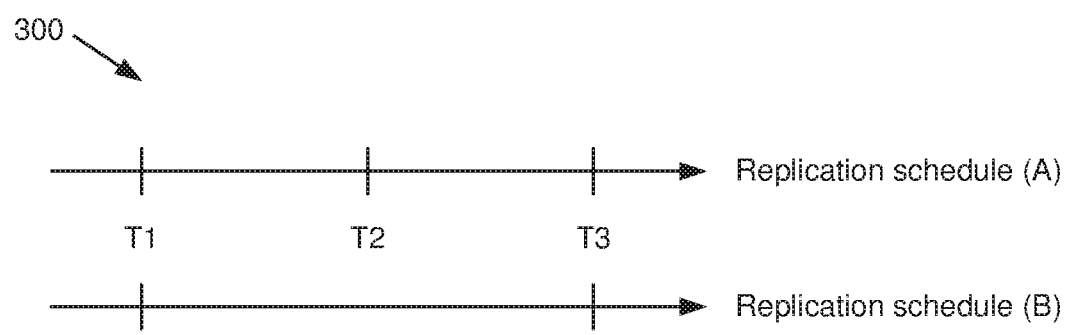
FIG. 3 is a diagram depicting example replication schedules that can be implemented for a data storage system in accordance with various aspects described herein.
Figure 4:
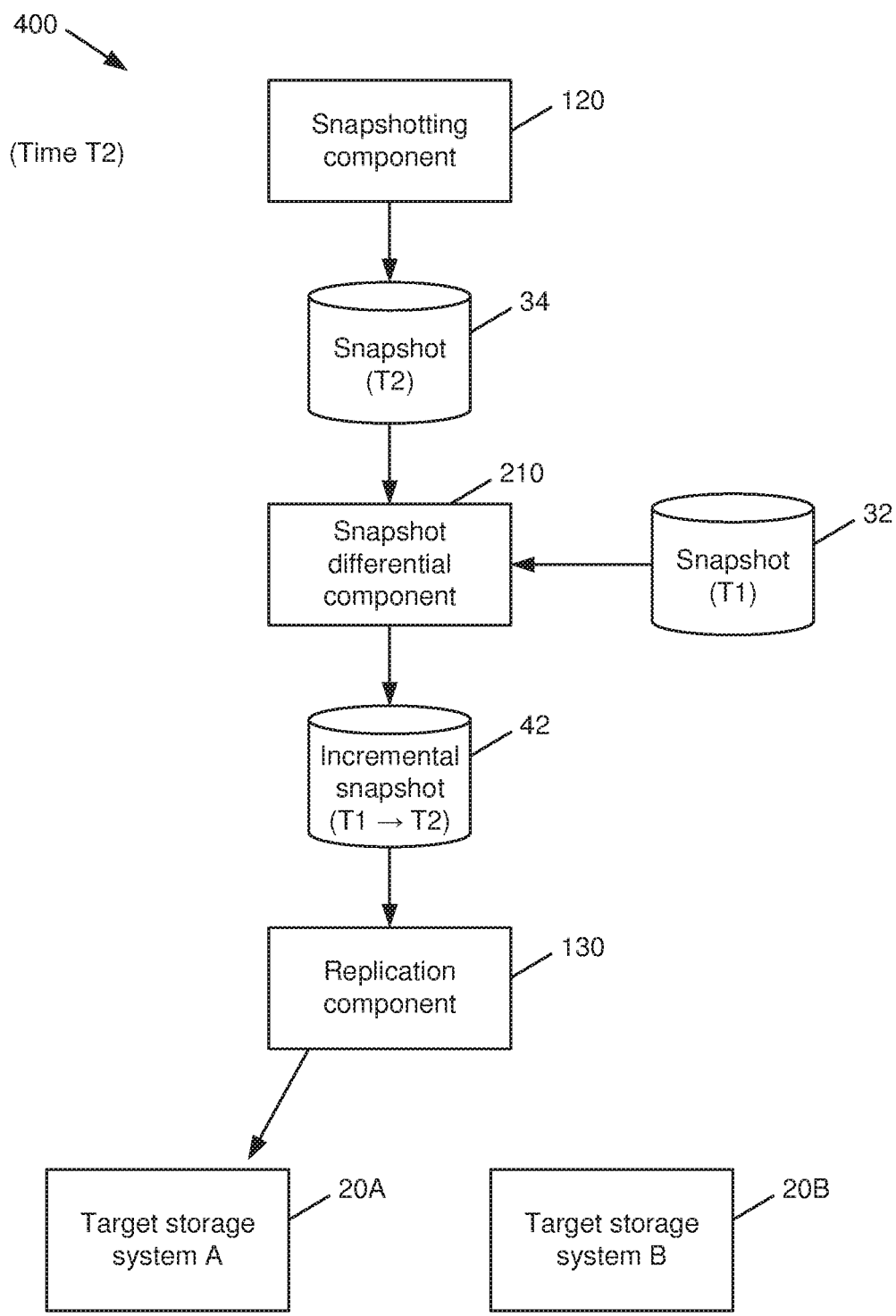
FIGS. 4-5 are respective block diagrams of a system that facilitates dataset creation and data replication at respective times indicated in the replication schedules of FIG. 3 in accordance with various aspects described herein.

As will be described below with respect to FIGS. 3-5, the incremental snapshot 40 as generated by the snapshot differential component 210 can be transferred to respective target storage systems 20, e.g., by the replication component 130 as shown in FIG. 1, instead of the full dataset snapshot. Substitution of an incremental snapshot 40 for a full dataset and/or dataset snapshot can be performed, e.g., if the underlying dataset has previously been replicated to the target system for the replication, and/or under various other conditions.

In an aspect, a data mover as described herein can leverage overlaps in independent replication schedules associated with different target systems to reduce the amount of dataset snapshots that are created, the amount of change computations associated with constructing incremental snapshots, etc. In an example as illustrated by diagram 300 in FIG. 3, a first replication schedule for a first remote storage system (e.g., target storage system 20A) can be associated with intervals of a first period, and a second replication schedule for a second remote storage system (e.g., target storage system 20B) can be associated with intervals of a second, different period.

In the specific example shown by diagram 300, the replication schedule for target storage system 20A is associated with intervals of a period (e.g., 4 hours, etc.) that are half that of the intervals associated with the replication schedule for target storage system 20B. As a result, replications can be scheduled for both target storage systems 20A and 20B at times T1 and T3 as denoted on diagram 300, while a separate replication for only target storage system 20A can be scheduled at time T2 as denoted on diagram 300. It should be appreciated that while the period associated with the first replication schedule in diagram 300 is half that of the period associated with the second replication schedule for clarity of illustration and description, respective replication schedules can be associated with any suitable period lengths provided that the respective replication schedules result in at least one overlapping scheduled replication. Further, one or more replication schedules can be adjusted in time in some cases to either create overlaps in different replication schedules where none exist or to increase the amount of overlapping scheduled replications for different systems, e.g., as will be discussed below with respect to FIGS. 6-7.

In an aspect, example processing flows that can be performed at each of times T1-T3 shown in diagram 300 are described below with further reference to FIGS. 1, 2, 4 and 5. It should be appreciated, however, that the following description relates to merely one way in which dataset creation and replication could be conducted and that other techniques could also be used.

At time T1, dataset creation and replication can be conducted in a manner similar to that described with respect to FIG. 1 above. For instance, at time T1, a shared dataset snapshot can be constructed by the snapshotting component 120 and replicated to target storage systems 20A and 20B in the manner described above. While the example shown in FIG. 1 can be utilized to conduct a full (initial, baseline, etc.) replication of the dataset 10 to target storage systems 20A and 20B, an incremental replication of the dataset 10 could instead be conducted at time T1, e.g., by creating an incremental snapshot 40 via a snapshot differential component 210 as further shown by FIG. 2.

At time T2, the replication schedules shown in diagram 300 are structured such that replication of the dataset 10 is scheduled for target storage system 20A but not target storage system 20B. Accordingly, dataset creation and replication can occur at time T2 as shown via system 400 in FIG. 4. As shown by FIG. 4, the snapshotting component 120 of system 400 can generate a snapshot 34 of the dataset 10 (not shown in FIG. 4) that represents the state of the dataset 10 at time T2. This snapshot 34 can then be compared to a snapshot 32 of the dataset 10 that was created at time T1 by the snapshot differential component 210 of system 400, resulting in an incremental snapshot 42 representing the changes to the dataset 10 that occurred between times T1 and T2. Upon creation of the incremental snapshot 42, the replication component 130 of system 400 can transfer the incremental snapshot 42 to remote system 20A as scheduled.

At time T3, the replication schedules shown in diagram 300 are structured such that replication of the dataset 10 is scheduled for both target storage systems 20A and 20B. Accordingly, system 400 can engage in dataset creation and replication at time T3 as shown by FIG. 5. Similar to the example shown in FIG. 4, the snapshotting component 120 can generate a snapshot 36 of the dataset 10 (not shown in FIG. 5) that represents the state of the dataset 10 at time T3. Subsequently, the snapshot differential component 210 can generate incremental snapshots 44 and 46 for target storage systems 20A and 20B, respectively, according to their respective replication schedules. More particularly, the snapshot differential component 210 can compute changes between the snapshot 36 generated at time T3 and the snapshot 34 previously generated at time T2 in order to create an incremental snapshot 44 for replication to target storage system 20A that includes the changes made to the underlying dataset 10 between time T2 (i.e., the time of the most recent replication to target storage system 20A) and time T3. Similarly, the snapshot differential component 210 can compute changes between the snapshot 36 generated at time T3 and the snapshot 32 generated at time T1 in order to create an incremental snapshot 46 for replication to target storage system 20B that includes the changes made to the underlying dataset 10 between time T1 (i.e., the time of the most recent replication to target storage system 20B) and time T3. Upon generation of the incremental snapshots 44 and 46, the replication component 130 can transfer said incremental snapshots 44 and 46 to their respectively corresponding target storage systems 20A and 20B.

Figure 5:
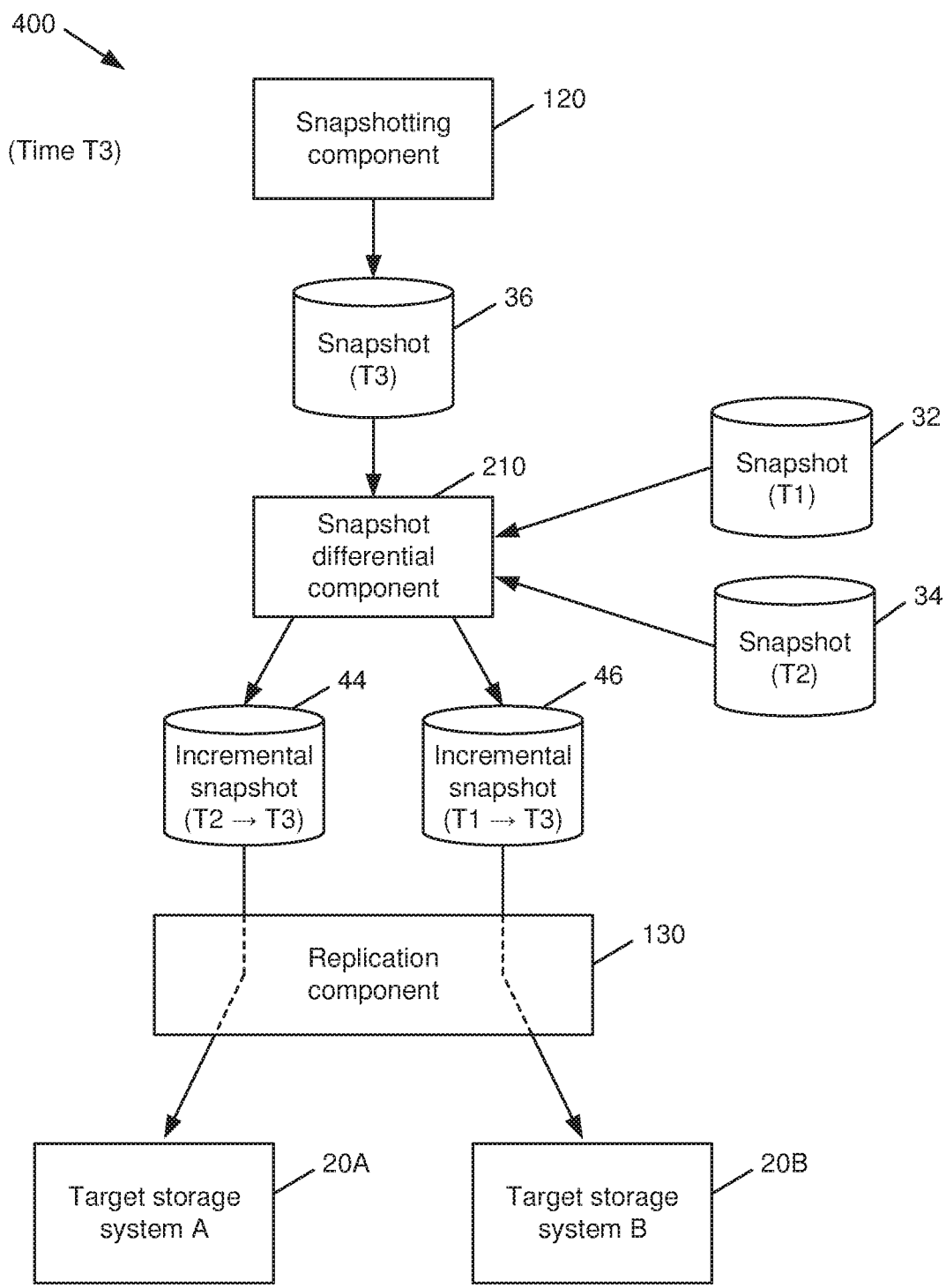

While FIG. 5 illustrates that the incremental snapshots 44 and 46 can be generated by the snapshot differential component 210 independently, it should be appreciated that the snapshot differential component 210 could also at least partially derive one or more incremental snapshots from other existing incremental snapshots. By way of example, the snapshot differential component 210 could generate the incremental snapshot 46 corresponding to dataset changes between times T1 and T3 by combining the incremental snapshot 42 corresponding to a differential between times T1 and T2 and the incremental snapshot 44 corresponding to a differential between times T2 and T3. Other operations could be performed on the resulting incremental snapshot 46, such as consolidating changes that occurred both between times T1 and T2 and between times T2 and T3, and/or other operations. Alternatively, the replication component could separately provide the incremental snapshot 42 generated for target storage system 20A at time T2 and the incremental snapshot 44 generated for target storage system 20A at time T3 instead of a combined incremental snapshot 46. Other techniques could also be used.

To further describe the advantages of separating dataset creation from replication, various techniques will now be described with reference to an example set of replication policies as given by Table 1 below.

TABLE 1

Example dataset replication policies
for a group of remote storage sites.

Policy A: /fs/data/store –> Remote 1
Policy B: /fs/data/store –> Remote 2
Policy C: /fs/data/store –> Remote 3

For a set of baseline dataset transfers conducted according to the policies in Table 1 in an example without independent dataset creation and replication, a first snapshot (snapshot N) of/fs/data/store can initially be created and transferred to Remote 1. Once replication of snapshot N to Remote 1 has completed, a second snapshot (snapshot N+1) of /fs/data/store can be created and transferred to Remote 2. Similarly a third snapshot (snapshot N+2) of/fs/data/store can be created and transferred to Remote 3 upon completion of the transfer to Remote 2. However, in addition to creating separate snapshots for each of the three policies, the generated snapshots can in some instances be different from one another, e.g., if changes occur to/fs/data/store during the above process.

In contrast, using the techniques described above with independent dataset generation and replication, a shared snapshot (snapshot N) can initially be created from /fs/data/store and subsequently transferred to each of Remote 1-3 without generating additional snapshots. By reducing the number of snapshots on the system, the storage capacity impact of the replication system on the cluster can be reduced. Additionally, as will be shown below, change computations for incremental snapshots can also be reduced for each synchronization job, e.g., due to the presence of fewer snapshots to interrogate. Moreover, fewer snapshots created also results in fewer snapshots to delete later, resulting in further savings in system resources.

Beyond there being fewer snapshots to inspect, using a shared snapshot enables the change computation phase for incremental synchronization to be completed once, e.g., instead of N times for each edge system, thereby reducing the resource load on the source system and allowing transfer to subsequent edge systems sooner. For instance, in the above example, an incremental synchronization that utilizes common schedules for dataset creation and replication would involve processing two snapshots (e.g., a base snapshot and snapshot N) for the differential for Remote A, three snapshots (e.g., the base snapshot and snapshots N and N+1) for Remote B, and four snapshots (e.g., the base snapshot and snapshots N, N+1 and N+2) for Remote C. In contrast, separating dataset creation from replication enables a single change computation to be performed between the base snapshot and a shared snapshot for all of Remote A-C.

Figure 6:
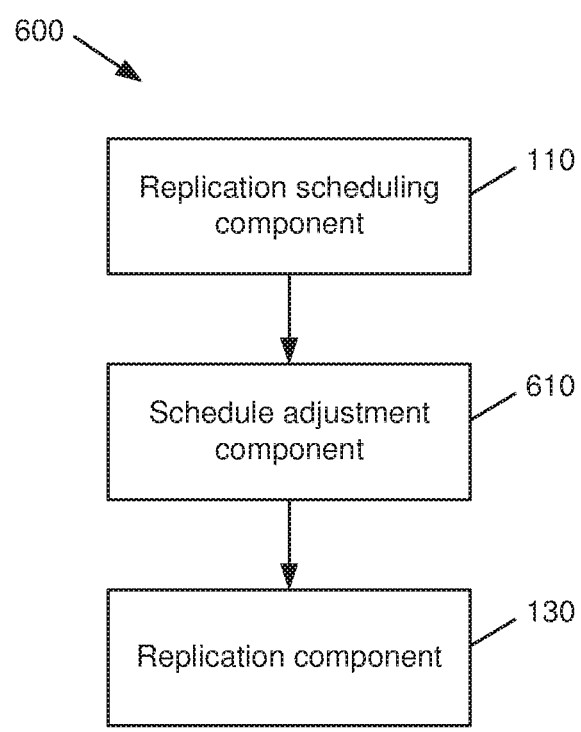
FIG. 6 is a block diagram of a system that facilitates replication schedule alignment and/or adjustment in accordance with various aspects described herein.

Turning now to FIG. 6, a block diagram of a system 600 that facilitates replication schedule alignment and/or adjustment in accordance with various aspects described herein is illustrated. Repetitive description of like elements employed in other embodiments described herein is omitted for brevity. As shown by FIG. 6, system 600 can include a schedule adjustment component 610 that can receive respective replication schedules, e.g., replication schedules associated with respective data movement policies, from the replication scheduling component 110. In an aspect, in the event that the respective data movement policies associated with the replication scheduling component 110 are unaligned in time, e.g., the respective replication schedules do not have transfers that are aligned in time such as the transfers at times T1 and T3 as shown in FIG. 3, the schedule adjustment component 610 can, as appropriate, shift one or more associated replication schedules such that at least one dataset transfer is aligned to occur at a common time.

Figure 7:
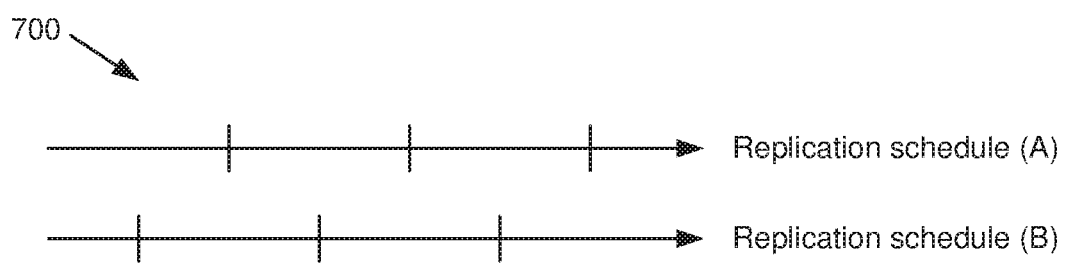
FIG. 7 is a diagram depicting example schedule adjustment operations that can be performed by the system of FIG. 6 in accordance with various aspects described herein.
Figure 7:
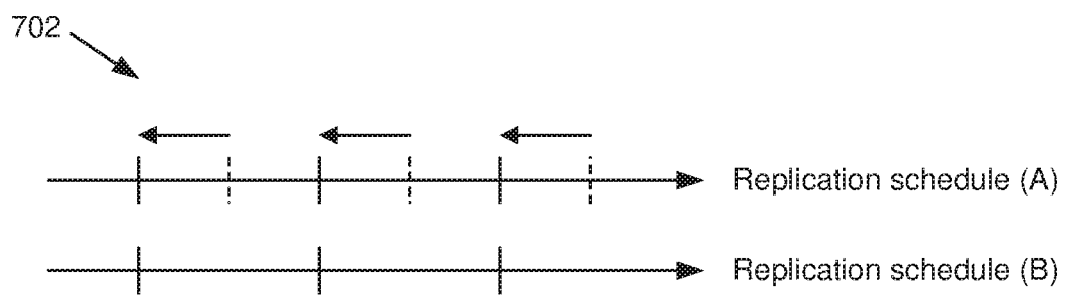

An example operation of the schedule adjustment component 610 is illustrated by FIG. 7 for an example set of replication schedules. As initially shown by diagram 700 in FIG. 7, a pair of replication schedules, denoted in FIG. 7 as replication schedule A and replication schedule B, can be set (e.g., by the replication scheduling component 110) with transfers scheduled to occur at intervals of respective periods. While, for the purposes of illustration, the intervals illustrated in replication schedules A and B are of the same period, it should be appreciated that the intervals associated with replication schedules A and B could alternatively be associated with different periods.

As further shown by diagram 700, replication schedules A and B are initially configured at an offset, e.g., such that replication schedules A and B do not share any common replication times. As further shown by diagram 702, the schedule adjustment component 610 can shift one of the replication schedules (here, replication schedule A) in time in order to cause at least a portion of the scheduled transfers associated with replication schedules A and B to occur at the same time, thereby enabling those transfers to utilize a shared dataset snapshot, e.g., as described with reference to the various aspects above.

In general, the schedule adjustment component 610 can be utilized to optimize the number of snapshots associated with a given set of replication schedules in response to identifying that the respective replication schedules do not match but have at least a threshold amount of overlap. The schedule adjustment component 610 can be utilized to adjust schedules that are defined based on an interval or a recovery point objective (RPO), and can also be configured to adjust fixed-time schedules (e.g., replicate every day at 2 AM, etc.) if given appropriate authorization by a system administrator or other entity.

In an aspect, by leveraging overlap between different replication schedules, the number of snapshots utilized by a data mover system can be substantially reduced. An example of snapshot savings that can be realized for a set of three policies with different replication intervals are provided in Tables 2-3 below.

TABLE 2

Example dataset replication policies having different scheduled intervals.

Policy A: /fs/data/store, every 4 hours
Policy B: /fs/data/store, every 12 hours
Policy C: /fs/data/store, every 16 hours

TABLE 3

Policy A-C snapshots for common and separate dataset generation and replication.

| Time | Snapshots for common generation/replication | Snapshots for separate generation/replication |
| --- | --- | --- |
| 4 AM | Policy A snapshot | Shared snapshot, used by A |
| 8 AM | Policy A snapshot | Shared snapshot, used by A |
| 12 PM | Policy A snapshot, Policy B snapshot | Shared snapshot, used by A + B |
| 4 PM | Policy A snapshot, Policy B snapshot | Shared snapshot, used by A + C |
| 8 PM | Policy A snapshot | Shared snapshot, used by A |
| 12 AM | Policy A snapshot, Policy B snapshot | Shared snapshot, used by A + B |

As shown by Tables 2-3 above, given two policies with the same dataset description (e.g., /fs/data/) and different schedules (e.g., every 4 hours, every 12 hours), snapshot creation can be organized such that the second policy (e.g., the 12-hour policy) can always utilize a shared snapshot instead of an individual snapshot, e.g., because 4 is a factor 12.

Figure 8:
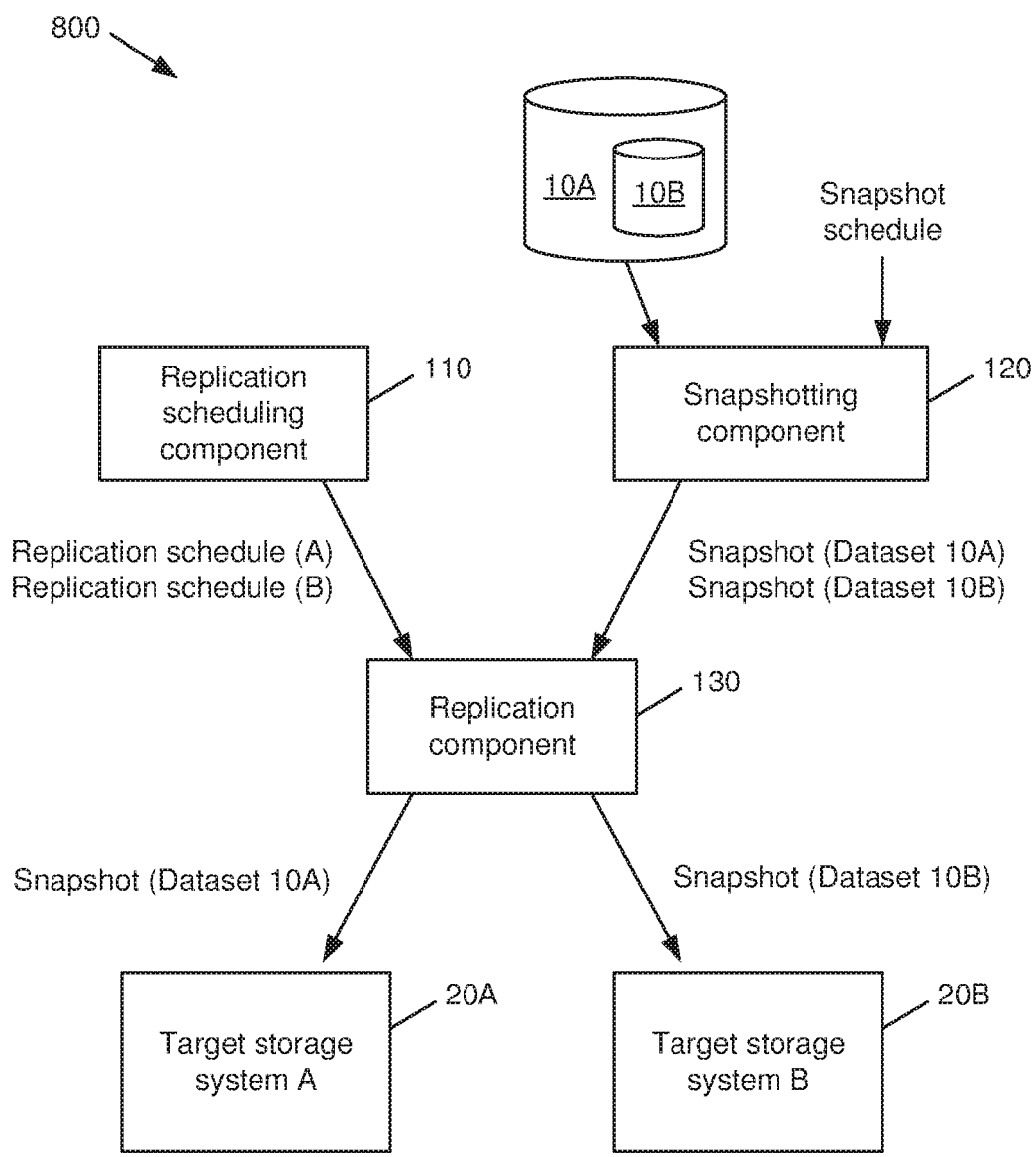
FIG. 8 is a block diagram of a system that facilitates snapshotting and replicating respective datasets of overlapping scope in accordance with various aspects described herein.

With reference now to FIG. 8, a block diagram of a system 800 that facilitates snapshotting and replicating respective datasets 10A-10B of overlapping scope in accordance with various aspects described herein is illustrated. Repetitive description of like elements employed in other embodiments described herein is omitted for brevity. In an aspect, system 800 in FIG. 8 illustrates an extension of the techniques described above for alignment in the time domain for also leveraging alignment in the file system domain.

Figure 9:
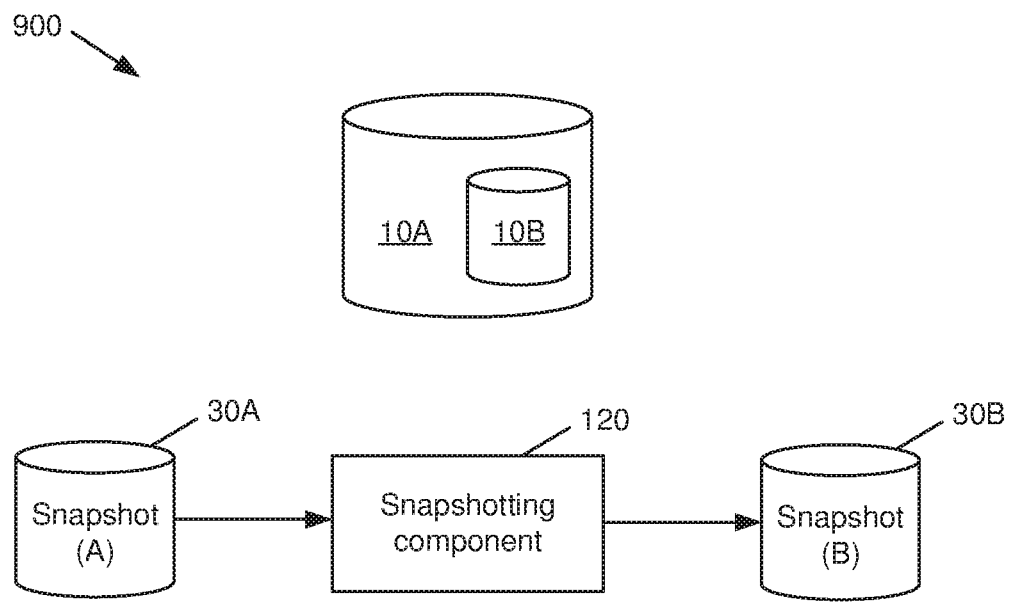
FIG. 9 is a block diagram of a system that facilitates derivation of a dataset snapshot from an existing dataset snapshot in accordance with various aspects described herein.

As shown by system 800, in response to replication being scheduled for a first dataset 10A and a second dataset 10B that is a subset of the first dataset 10A that includes less than all of the first dataset 10A (e.g., due to dataset 10A being associated with a higher root and dataset 10B being associated with a lower root, etc.), the snapshotting component 120 can leverage the overlap in the datasets to avoid generating an independent snapshot for dataset 10B. Instead, as further shown by system 900 in FIG. 9, the snapshotting component 120 can derive a snapshot 30B for the lower-root dataset 10B from an already generated snapshot 30A of the higher-root dataset 10A. The respective snapshots 30A-30B can then be provided to the replication component 130 for distribution to their associated target storage systems 20A-20B, e.g., as described above for the time domain.

Figure 10:
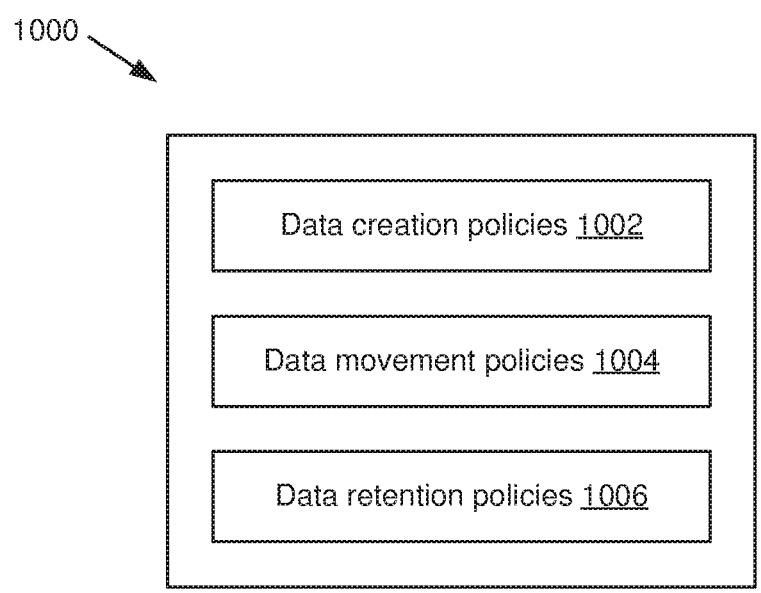
FIG. 10 is a diagram depicting an example policy framework that can be utilized by various embodiments as described herein.

Turning now to FIG. 10, a diagram 1000 depicting an example policy framework that can be utilized by various embodiments as described herein is illustrated. In an aspect, the policy framework shown by diagram 1000 can include dataset creation policies 1002, dataset movement policies 1004, and dataset retention policies 1006. Other types of policies could also be used in addition to, or in place of, the policies shown by diagram 1000. In an aspect, dataset creation policies 1002 and dataset movement policies 1004 can be created and/or adjusted by a system administrator and/or another user, predefined by the data storage system, and/or implemented in any other suitable manner Based on a retention period as specified in the dataset creation policies 1002 and/or dataset movement policies 1004, the dataset retention policies 1006 can be created by a data storage system (e.g., via a data mover subsystem) on a source and/or target system.

In an aspect, the dataset creation policies 1002 can have parameters including, but not necessarily limited to, the following:
1) Dataset base path
2) Path set within the dataset base path
3) One-off policy indicator (e.g., implemented as a Boolean value)
4) RPO, e.g., for non-one-off policies
5) Source data retention period after completion of relevant transfers
6) Policy enabled indicator (e.g., implemented as a Boolean value)

In another aspect, the dataset movement policies 1004 can copy datasets created via the dataset creation policies 1002. The dataset movement policies 1004 can have parameters including, but not necessarily limited to, the following:
1) Source and target account identifiers
2) Dataset creation policy identifier
3) Target dataset format, e.g., for baseline synchronizations to the cloud
4) Initial dataset identifier for differential calculations against the initial dataset (e.g., implemented as an optional value assuming the relevant dataset exists on both the source and the target)
5) Target base path (or a bucket name for object accounts)
6) Boolean indicator of whether to create a recovery point or track the dataset after successful synchronization
7) Job priority
8) Preferred account (e.g., source or target) where tasks should be created
9) Error threshold (e.g., absolute or relative) for job failure
10) Target dataset retention period after completion of relevant transfers
11) Policy enabled indicator (e.g., implemented as a Boolean value)
12) Valid policy indicator (e.g., implemented as a Boolean value). For instance, a policy can be indicated as invalid if an incremental synchronization is due and no previous snapshots or datasets for calculating a differential exist.

In a further aspect, the dataset retention policies 1006 can have parameters including, but not necessarily limited to, the following:
1) Source/target dataset retention period after completion of relevant transfers
2) File transfer error threshold (e.g., absolute or relative) to prevent source dataset deletion
3) Policy enabled indicator (e.g., implemented as a Boolean value)

In an aspect, the dataset retention policies 1006 can be made effective only after all data transfers and/or policies linked to the dataset creation policies 1002 have been completed.

Figure 11:
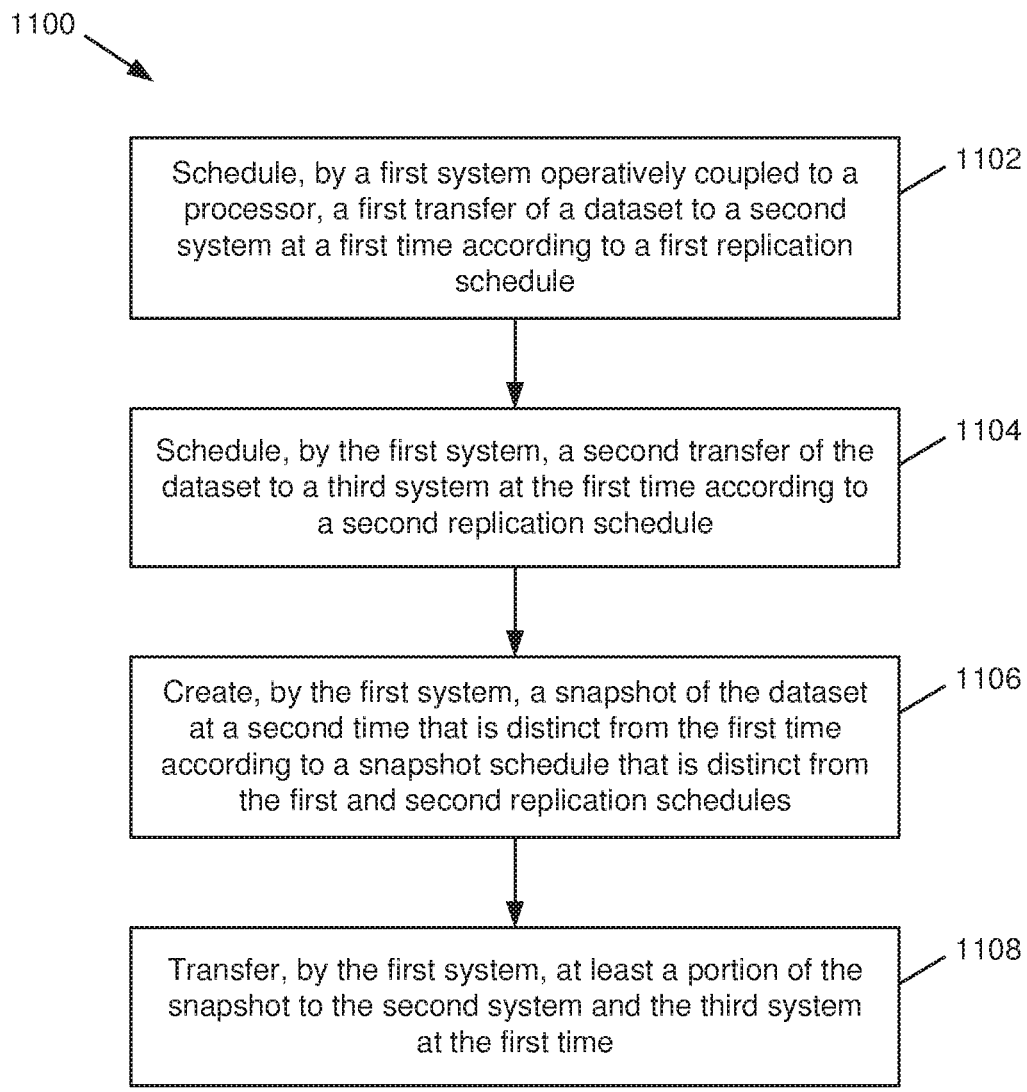
FIG. 11 is a flow diagram of a method that facilitates separation of dataset creation from movement in file replication in accordance with various aspects described herein.

Referring next to FIG. 11, a flow diagram of a method 1100 that facilitates separation of dataset creation from movement in file replication in accordance with various aspects described herein is illustrated. At 1102, a first system operatively coupled to a processor can schedule (e.g., by a replication scheduling component 110) a first transfer of a dataset (e.g., a dataset 10) to a second system (e.g., a target storage system 20A) at a first time according to a first replication schedule.

At 1104, the first system can further schedule (e.g., by the replication scheduling component 110) a second transfer of a dataset to a third system (e.g., a target storage system 20B) at the first time according to a second replication schedule.

At 1106, the first system can create (e.g., by the snapshotting component 120) a snapshot of the dataset at a second time that is distinct from the first time according to a snapshot schedule that is distinct from the first and second replication schedules used at 1102 and 1104, respectively.

At 1108, the first system can transfer (e.g., by a replication component 130) at least a portion of the snapshot created at 1106 to the second system and the third system at the first time.

FIG. 11 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 12:
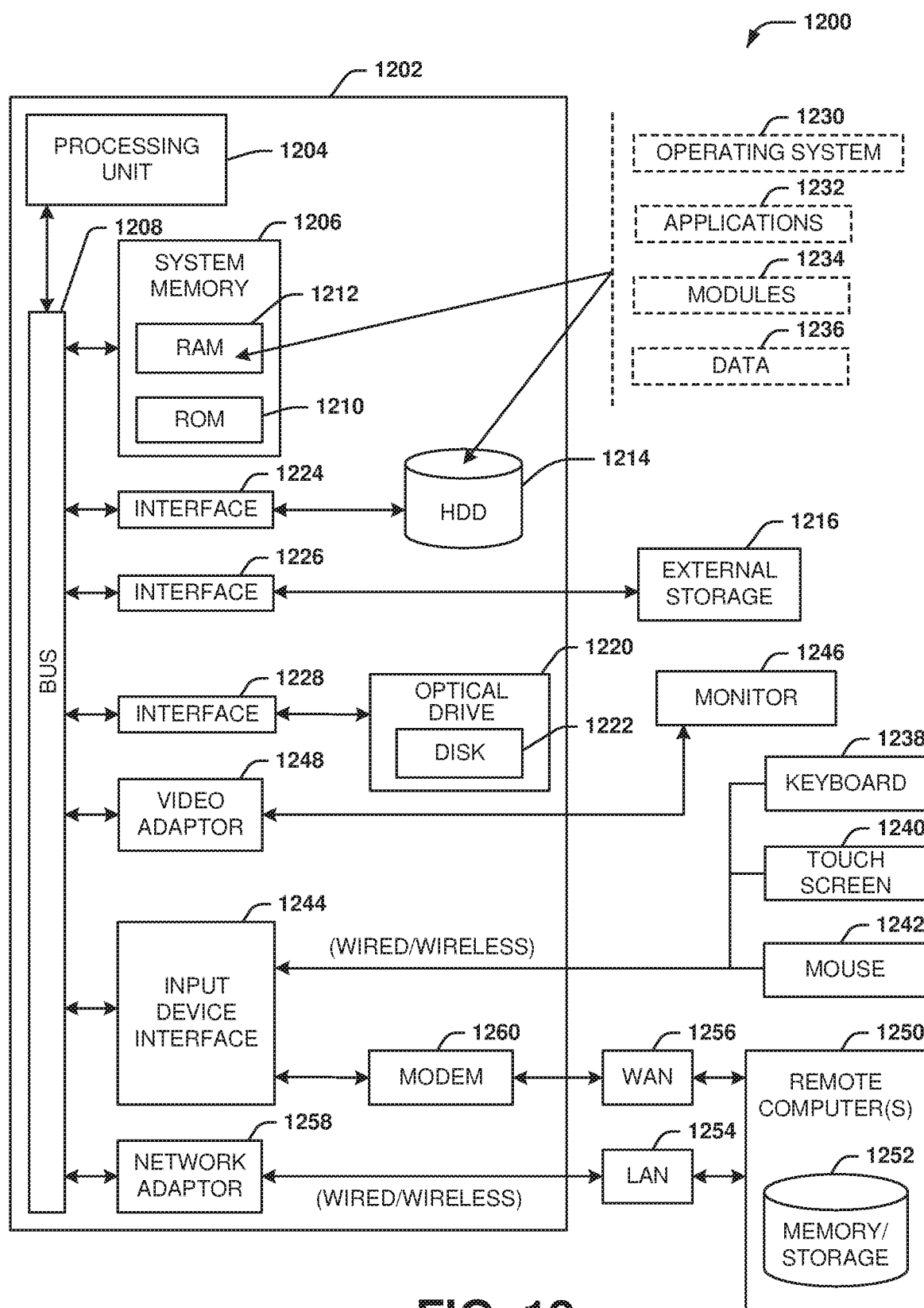
FIG. 12 is a diagram of an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD), a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
a memory that stores computer executable components; and
a processor that executes the computer executable components stored in the memory, wherein the computer executable components comprise:
a replication scheduling component that schedules a first transfer of a dataset to a first target storage system at a first time according to a first replication schedule, schedules a second transfer of the dataset to a second target storage system at the first time according to a second replication schedule, and schedules a third transfer of the dataset to the first target storage system at a second time, distinct from the first time, according to the first replication schedule;
a snapshotting component that generates a first snapshot of the dataset at a third time that precedes the first time according to a snapshot schedule that is distinct from the first replication schedule and the second replication schedule wherein the snapshotting component generates a second snapshot of the dataset at a fourth time that precedes the second time further according to the snapshot schedule; and
a replication component that transfers at least a portion of the first snapshot to the first target storage system and the second target storage system at the first time, wherein the replication component transfers at least a portion of the second snapshot to the first target storage system at the second time without transferring any of the second snapshot to the second target storage system at the second time.

2. The data storage system of claim 1, wherein the first replication schedule is associated with intervals of a first period, and wherein the second replication schedule is associated with intervals of a second period that is distinct from the first period.

3. The data storage system of claim 1, wherein the computer executable components further comprise:
a schedule adjustment component that shifts one of the first replication schedule or the second replication schedule such that the first transfer of the dataset and the second transfer of the dataset are aligned to occur at the first time.

4. The data storage system of claim 3, wherein the first replication schedule is associated with intervals of a period, wherein the second replication schedule is fixed at the first time, and wherein the schedule adjustment component shifts the first replication schedule such that an interval, of the intervals of the first replication schedule, aligns with the first time.

5. The data storage system of claim 1, wherein the computer executable components further comprise:
a snapshot differential component that constructs an incremental snapshot of the dataset corresponding to respective changes between the first snapshot of the dataset and a third snapshot of the dataset that was generated prior to the first snapshot.

6. The data storage system of claim 5, wherein the replication component transfers the incremental snapshot to the first target storage system and the second target storage system at the first time instead of the first snapshot.

7. The data storage system of claim 1, wherein the dataset is a first dataset, wherein the replication scheduling component further schedules a fourth transfer of a second dataset to a third target storage system at the first time according to a third replication schedule, and wherein the second dataset is a subset of the first dataset that comprises less than all of the first dataset.

8. The data storage system of claim 7, wherein the snapshotting component derives a third snapshot of the second dataset from the first snapshot of the first dataset.

9. A method, comprising:
scheduling, by a first system operatively coupled to a processor, a first transfer of a dataset to a second system at a first time according to a first replication schedule;
scheduling, by the first system, a second transfer of the dataset to a third system at the first time according to a second replication schedule;
scheduling, by the first system, a third transfer of the dataset to the second system at a second time, distinct from the first time, according to the first replication schedule;
creating, by the first system, a first snapshot of the dataset at a third time that is distinct from the first time according to a snapshot schedule that is distinct from the first replication schedule and the second replication schedule;
creating, by the first system, a second snapshot of the dataset at a fourth time that precedes the second time according to the snapshot schedule;
transferring, by the first system, at least a portion of the first snapshot to the second system and the third system at the first time; and
transferring, by the first system, at least a portion of the second snapshot to the second system at the second time without transferring any of the second snapshot to the third system at the second time.

10. The method of claim 9, wherein the first replication schedule is associated with intervals of a first period, and wherein the second replication schedule is associated with intervals of a second period that is distinct from the first period.

11. The method of claim 9, wherein the dataset is a first dataset, and wherein the method further comprises:
scheduling, by the first system, a fourth transfer of a second dataset to a fourth system at the first time according to a third replication schedule, wherein the second dataset is a subset of the first dataset that comprises less than all of the first dataset.

12. The method of claim 9, further comprising:
adjusting, by the first system, one of the first replication schedule or the second replication schedule such that the first transfer of the dataset and the second transfer of the dataset are aligned to occur at the first time.

13. The method of claim 9, wherein the method further comprises:
generating, by the first system, a differential snapshot of the dataset corresponding to respective changes between the first snapshot of the dataset and a third snapshot of the dataset that was generated prior to the first snapshot.

14. The method of claim 13, wherein the transferring comprises transferring the differential snapshot to the second system and the third system at the first time instead of the first snapshot.

15. A non-transitory machine-readable medium comprising computer executable instructions that, when executed by a processor of a data storage system, facilitate performance of operations, the operations comprising:
scheduling a first transfer of a dataset to a first remote system at a first time according to a first replication schedule;
scheduling a second transfer of the dataset to a second remote system at the first time according to a second replication schedule;
scheduling a third transfer of the dataset to the first remote system at a second time, distinct from the first time, according to the first replication schedule;
generating a first snapshot of the dataset at a third time that precedes the first time according to a snapshot schedule that is distinct from the first replication schedule and the second replication schedule;
generating a second snapshot of the dataset at a fourth time that precedes the second time according to the snapshot schedule;
replicating at least a portion of the first snapshot to the first remote system and the second remote system at the first time; and
replicating at least a portion of the second snapshot to the first remote system at the second time without replicating any of the second snapshot to the second remote system at the second time.

16. The non-transitory machine-readable medium of claim 15, wherein the first replication schedule is associated with intervals of a first period, and wherein the second replication schedule is associated with intervals of a second period that is distinct from the first period.

17. The non-transitory machine-readable medium of claim 15, wherein the dataset is a first dataset, and wherein the operations further comprise:
scheduling a fourth transfer of a second dataset to a third remote system at the first time according to a third replication schedule, wherein the second dataset is a subset of the first dataset that comprises less than all of the first dataset.

18. The non-transitory machine-readable medium of claim 15, wherein the operations further comprise:
adjusting one of the first replication schedule or the second replication schedule such that the first transfer of the dataset and the second transfer of the dataset are aligned to occur at the first time.

19. The non-transitory machine-readable medium of claim 15, wherein the operations further comprise:
generating an incremental snapshot of the dataset corresponding to respective changes between the first snapshot of the dataset as generated at the second time and a third snapshot of the dataset as generated prior to the first snapshot.

20. The non-transitory machine-readable medium of claim 19, wherein the operations further comprise:
replicating the incremental snapshot to the first remote system and the second remote system at the first time instead of the first snapshot.

* * * * *